US012397998B2

(12) United States Patent
Samoilenko et al.

(10) Patent No.: US 12,397,998 B2
(45) Date of Patent: Aug. 26, 2025

(54) RAIL WHEEL CHAIN CONVEYOR

(71) Applicant: Innovative Ideas LLC, Loveland, CO (US)

(72) Inventors: Yegor Samoilenko, Loveland, CO (US); Aliaksandr Yelchyshchau, Lakewood, CO (US)

(73) Assignee: Innovative Ideas LLC, Loveland, CO (US)

( * ) Notice: Subject to any disclaimer, the term of this patent is extended or adjusted under 35 U.S.C. 154(b) by 151 days.

(21) Appl. No.: 18/316,390

(22) Filed: May 12, 2023

(65) Prior Publication Data

US 2023/0365339 A1 Nov. 16, 2023

Related U.S. Application Data

(60) Provisional application No. 63/364,642, filed on May 13, 2022.

(51) Int. Cl.
*B65G 23/04* (2006.01)
(52) U.S. Cl.
CPC .................................. *B65G 23/04* (2013.01)
(58) Field of Classification Search
CPC ..................................................... B65G 23/04
USPC ......................................................... 198/835
See application file for complete search history.

(56) References Cited

U.S. PATENT DOCUMENTS

| 1,422,662 | A | | 7/1922 | Bylger |  |
|---|---|---|---|---|---|
| 1,446,270 | A | | 2/1923 | Pfeiffer |  |
| 2,766,076 | A | | 10/1956 | Saxe |  |
| 3,253,416 | A | | 5/1966 | Madison |  |
| 3,763,993 | A | * | 10/1973 | Whikehart | B65G 23/00 198/835 |
| 3,773,167 | A | * | 11/1973 | McGinnis | B65G 23/36 198/818 |
| 3,963,114 | A | * | 6/1976 | Younger | B65G 23/32 100/168 |

(Continued)

FOREIGN PATENT DOCUMENTS

| FR | 1354297 A | * | 3/1964 |
| WO | 2014172798 | | 10/2014 |

OTHER PUBLICATIONS

FR1354297 (english translation) (Year: 1964).*

(Continued)

*Primary Examiner* — Gene O Crawford
*Assistant Examiner* — Lester Rushin, III
(74) *Attorney, Agent, or Firm* — Trenner Law Firm, LLC; Mark Trenner

(57) ABSTRACT

An example rail wheel chain conveyor includes a first rail spaced apart from a second rail to form a transport area therebetween. A conveyor belt is configured in the transport area as a loop for moving along a continuous path. A plurality of rocker arms are spaced apart from one another and configured to support the conveyor belt. Rail wheels on each side of the rocker arms ride on the rails. A chain is mounted to an underside of the conveyor belt by being rigidly attached to the rocker arm. The example rail wheel chain conveyor includes a primary drive system having a primary chainring mounted on a drive shaft and engaging with the chain, and a primary drive motor to rotate the drive shaft, thereby rotating the chainring and moving the conveyor belt along the continuous path.

28 Claims, 9 Drawing Sheets

(56) References Cited

U.S. PATENT DOCUMENTS

| | | |
|---|---|---|
| 4,993,540 A | 2/1991 | Van Capelleveen |
| 7,040,480 B2 | 5/2006 | Sedlacek |
| 8,177,055 B2 | 5/2012 | Zamorano |
| 8,985,317 B2 | 3/2015 | Martin |
| 10,124,960 B2 | 11/2018 | Menke |
| 2010/0193618 A1 | 8/2010 | Lewis-Gray |
| 2019/0193944 A1 | 6/2019 | Brunschwiler et al. |

OTHER PUBLICATIONS

CN 208868819 U (Year: 2019).*
"Apron Conveyor For Ore," available from Alibaba.com, accessed on Jan. 31, 2022, 6 pages.
"Railveyor," available from https://railveyor.com/what-is-railveyor/technology/, accessed on May 12, 2023, 10 pages.

* cited by examiner

RAIL WHEEL CHAIN CONVEYOR

PRIORITY CLAIM

This application claims the priority filing benefit of U.S. Provisional Patent Application No. 63/364,642 filed May 13, 2022 for "Rail Wheel Chain Conveyor" of Samoilenko, et al., hereby incorporated by reference in its entirety as though fully set forth herein.

BACKGROUND

Ore can be transported at a mining site by truck. But conveyor systems have several advantages over trucks. The most commonly used type of conveyor system for transporting ore is the roller belt conveyor, which requires the ore to be milled into smaller pieces. An example roller belt conveyor 1 is illustrated in FIG. 1, as it may be installed at a mining operation 2 to transport ore 3 to a mill to be processed. The roller belt conveyor 1 has a belt 4 that may frictionally engage with rollers 5 to move the ore 6 and/or other material that has been loaded onto the belt 4. A walkway 7 with handrail 8 is also seen as these may be used by the mining operators for maintenance and/or inspection of the ore 6 being transported.

Roller belt conveyors, such as the one shown in FIG. 1, may have a large main drive to move the belt. This increases both the complexity of the design and the maintenance, thus increasing overall costs to build and operate. In addition, during operation the belt experiences "beating" forces as it passes over the rollers because the belt is both the pulling entity and the load bearing entity. In addition, this type of conveyor is typically limited in the maximum allowed length by the drive size. The rollers also make providing turns a challenge, usually resulting in conveyors that are straight along the entire length of the path of the belt.

DETAILED DESCRIPTION

Figure 1:
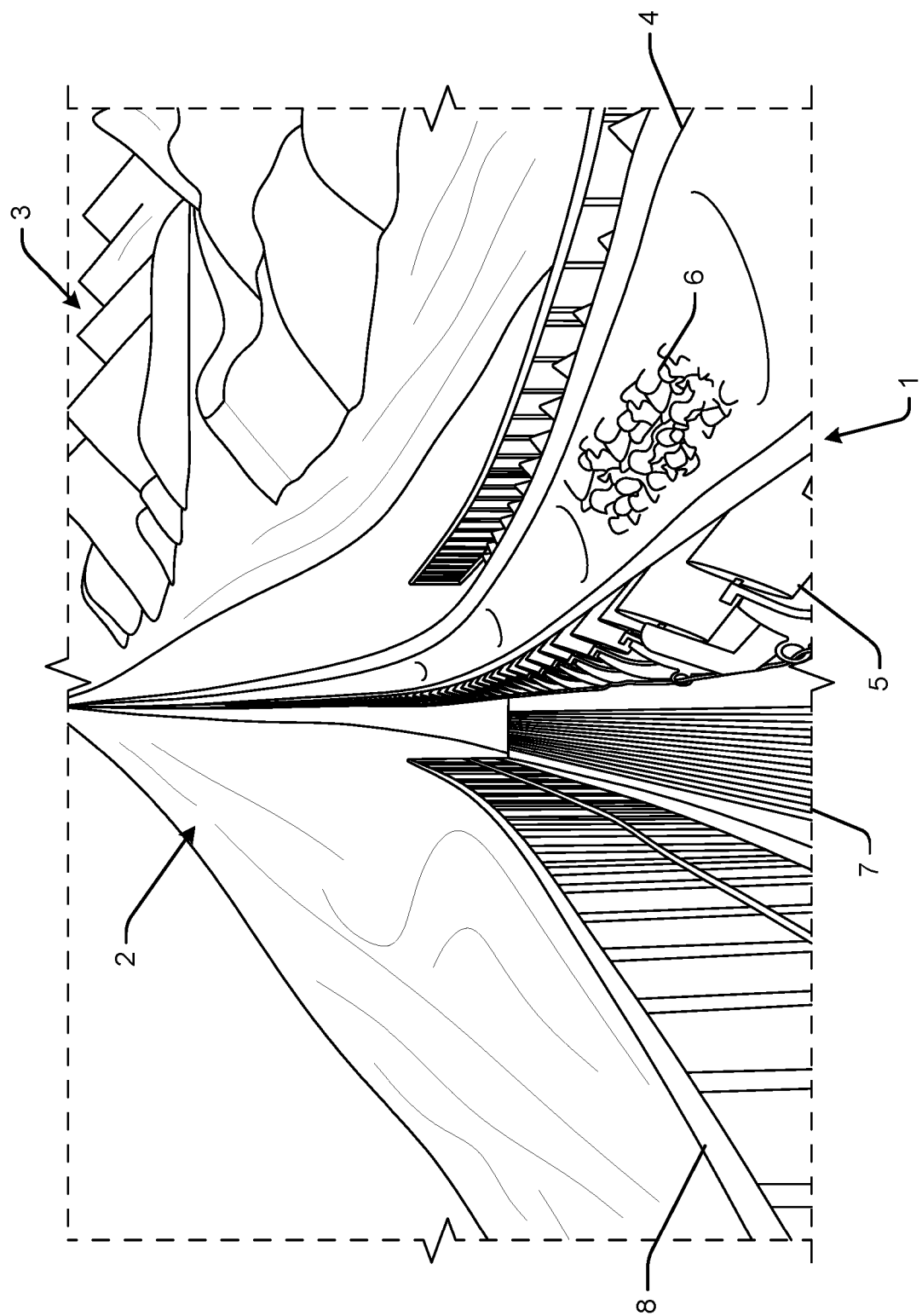
FIG. 1 shows an example of a conventional roller belt conveyor which may be used to transport ore.

A rail wheel chain conveyor is disclosed which may be implemented for continuous transportation of loads. The example rail wheel chain conveyor may transport ore and/or other loads of various sizes (e.g., up to about 1 meter in linear dimension) over any distance.

An example rail wheel chain conveyor includes a first rail spaced apart from a second rail to form a transport area therebetween. A conveyor belt is configured in the transport area as a loop for moving the conveyor belt along a continuous path to transport material. A plurality of rocker arms are spaced apart from one another along a length of the conveyor belt. In an example, the plurality of rocker arms form a generally U-shaped profile to provide sides to the conveyor belt. In an example, the conveyor belt is attached to the plurality of rocker arms.

A rail wheel on each side of each of the rocker arms rides on the first and second rails. Chains are mounted to an underside of the conveyor belt by being rigidly attached to the rocker arms or beams. The example rail wheel chain conveyor may have at least one primary drive system. In an example, the primary drive system is on at least one end of the loop formed by the conveyor belt. An example of the primary drive system includes a primary driveshaft, and primary chainrings mounted on the primary drive shaft and engaging with the corresponding chains. A primary drive motor rotates the primary drive shaft, thereby rotating the chainrings and moving the conveyor belt along the continuous path.

In an example, the primary chainring engages the chain in both a first travel direction for transporting material, and in a second travel direction for returning the conveyor belt.

An example rail wheel chain conveyor also includes a third rail spaced apart from a fourth rail. The first and second rails form an upper rail path and the third and fourth rails form a lower rail path. The first rail wheel and the second rail wheel ride on the upper rail path to move the conveyor belt in an upright configuration for transporting the material. The third rail wheel and the fourth rail wheel ride on the lower rail path to move the conveyor belt in an upside down configuration for returning the conveyor belt.

The example rail wheel chain conveyor may also include bearing and pulling chains that are rigidly attached to the rocker arms or beams. The belt sits on top of the chains and is clamped to the rocker arms/beams. In an example, the belt is not the pulling entity, instead serving only as a load bearing entity. Small rail wheels are attached to the rocker arms/beams and provide the belt with the ability to move and carry the ore (or other loads). The rail wheels may also be sized to accommodate turns along the length of the conveyor, if needed.

In an example, the rail wheel chain conveyor enables installing multiple drives, at any desired distance apart. This also allows the system to be built in any desired length (e.g., even a mile or longer in length). An example rail wheel chain conveyor also includes at least one secondary drive system having a secondary chainring(s) mounted on a secondary drive shaft and engaging with the chain(s). A secondary drive motor rotates the secondary drive shaft, thereby rotating the chainring(s) and moving the conveyor belt along the continuous path.

An example rail wheel chain conveyor also includes rail wheel guards configured as stoppers that help prevent the rail wheels from going off of the rails.

In an example, the rail wheel chain conveyor can transport loads of various sizes (e.g., about 1 meter in linear dimension). The rail wheel chain conveyor may be configured to transport any size material (larger or smaller than 1 meter), based on design considerations such as, but not limited to the width of the belt and the rocker beam design. A conventional belt conveyor typically requires the ore to be milled to a relatively small size.

In an example, the belt of the example rail wheel chain conveyor is not the pulling entity. Instead, the belt is only the "bearing" one, resting on top of the pulling chains and rocker beams. The belt is not exposed to the "beating" loads during movement, unlike a traditional belt conveyor design where the belt experiences impact forces every time it slides over rollers underneath. In addition, a secondary belt (e.g., a used belt) can be provided on top of the primary belt to further protect the primary belt and increase its longevity.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

Figure 2:
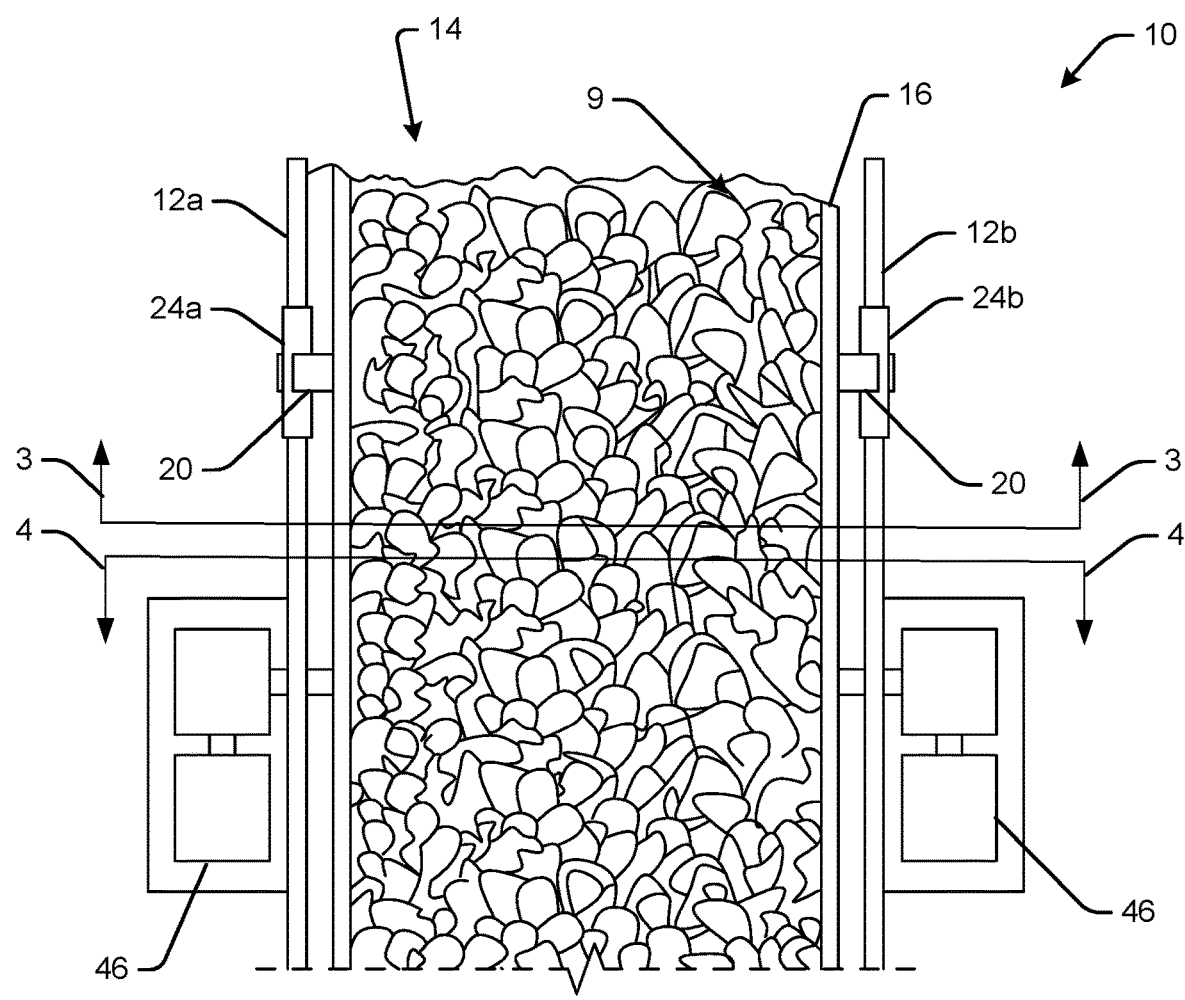
FIG. 2 is a top view of a section of the example rail wheel chain conveyor.
Figure 3:
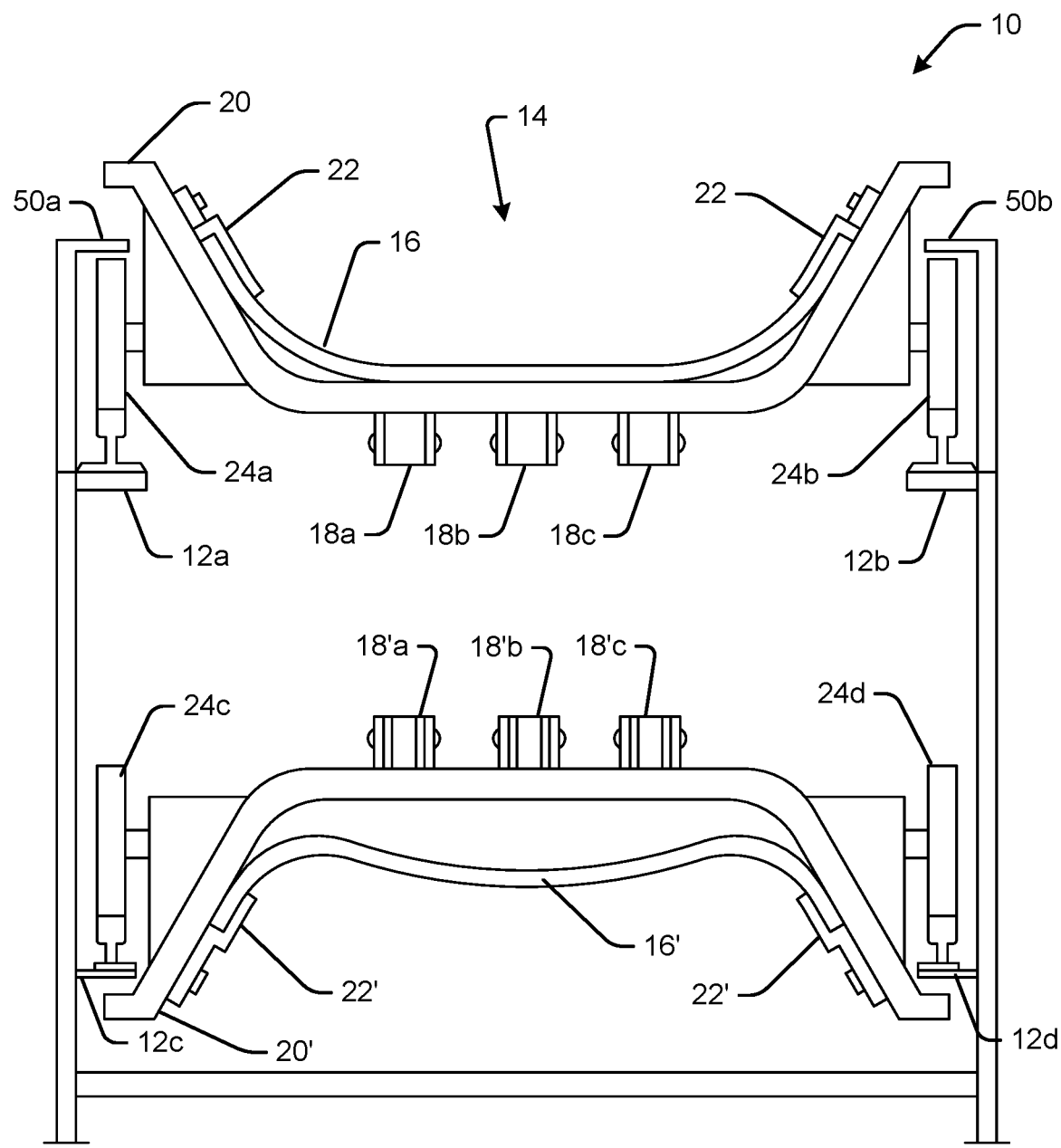
FIG. 3 is a cross sectional view of an example rail wheel chain conveyor illustrated without a load, and taken along lines 3-3 in FIG. 2.
Figure 4:
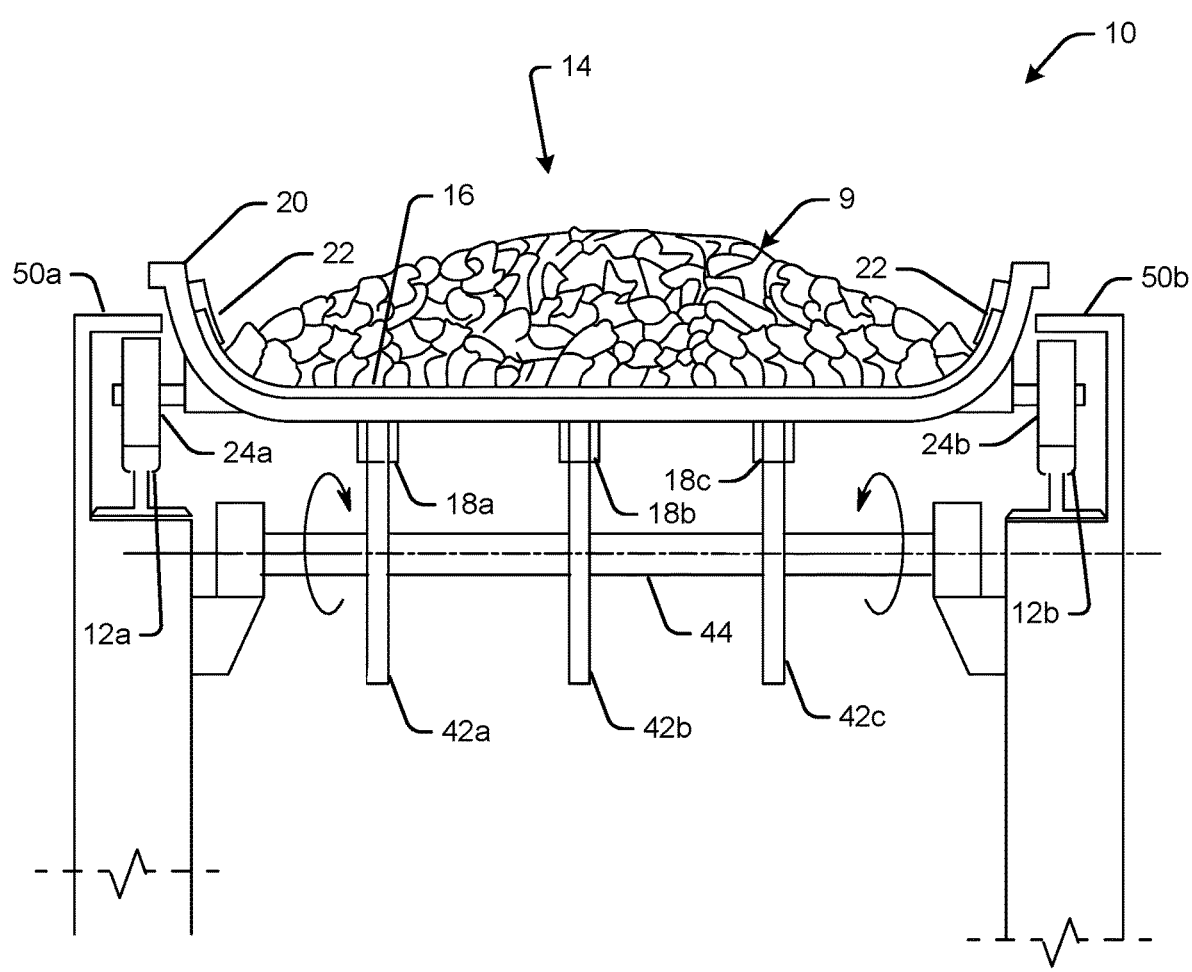
FIG. 4 is a cross sectional view of the example rail wheel chain conveyor illustrated with a load, and taken along lines 4-4 in FIG. 2.

FIG. 2 is a top view of a section of the example rail wheel chain conveyor 10. FIG. 3 is a cross sectional view of an example rail wheel chain conveyor 10 illustrated without a load, and taken along lines 3-3 in FIG. 2. FIG. 4 is a cross sectional view of the example rail wheel chain conveyor 10 illustrated with a load 9, and taken along lines 4-4 in FIG. 2.

An example of the rail wheel chain conveyor 10 includes a first rail 12a forming a first side of the conveyor system, and a second rail 12b forming a second side of the conveyor system. The second rail 12b is spaced apart from the first rail 12a to form a transport area 14 therebetween. A conveyor belt 16 is configured in the transport area 14 as a continuous loop for moving along a continuous path. The example rail wheel chain conveyor 10 also includes at least one chain (three chains 18a-c are shown in FIG. 3) mounted to an underside of the conveyor belt 16 by being rigidly attached to the rocker arm 20. Other engagement mechanisms having similar properties to a chain (e.g., the ability to go around the end of a loop) may also be implemented instead of a chain.

The example rail wheel chain conveyor 10 also includes a plurality of rocker arms 20 spaced apart (e.g., about every 2 meters) from one another and configured to support the conveyor belt 16. The conveyor belt 16 may be attached (e.g., by clamps 22, as shown in FIG. 3) to the plurality of rocker arms 20. The plurality of rocker arms 20 may have a generally U-shaped profile to form sides of the conveyor belt 16. This U-shaped configuration may aid in retaining ore on the conveyor belt 16 so that ore 9 does not spill off of the sides of the conveyor belt 16.

The example rail wheel chain conveyor 10 also includes a first rail wheel 24a on the first side of each rocker arm 20, and a second rail wheel 24b on the second side of each rocker arm 20. The first rail wheel 24a rides on the first rail 12a, and the second rail wheel 24b rides on the second rail 12b.

In an example, the rail wheel chain conveyor 10 includes a third rail 12c on the first side and a fourth rail 12d on the second side. The first and second rails 12a-b form an upper (transport) rail path, and the third and fourth rails 12c-d form a lower (return) rail path. In an example, the first rail wheel 24a and the second rail wheel 24b ride on the upper (transport) rail path to move the conveyor belt 16 in an upright configuration for transporting ore or other material. Corresponding rail wheels 24c-24d on the return path ride on the lower (return) rail path (rails 12c-d) to move the conveyor belt 16 in an upside down configuration for returning the conveyor belt 16 (e.g., as part of the continuous loop formed by the belt). It is noted that prime designations (e.g., 16', 18'a-c, 20', and 22') are used to denote similar components on the return path.

Figure 5:
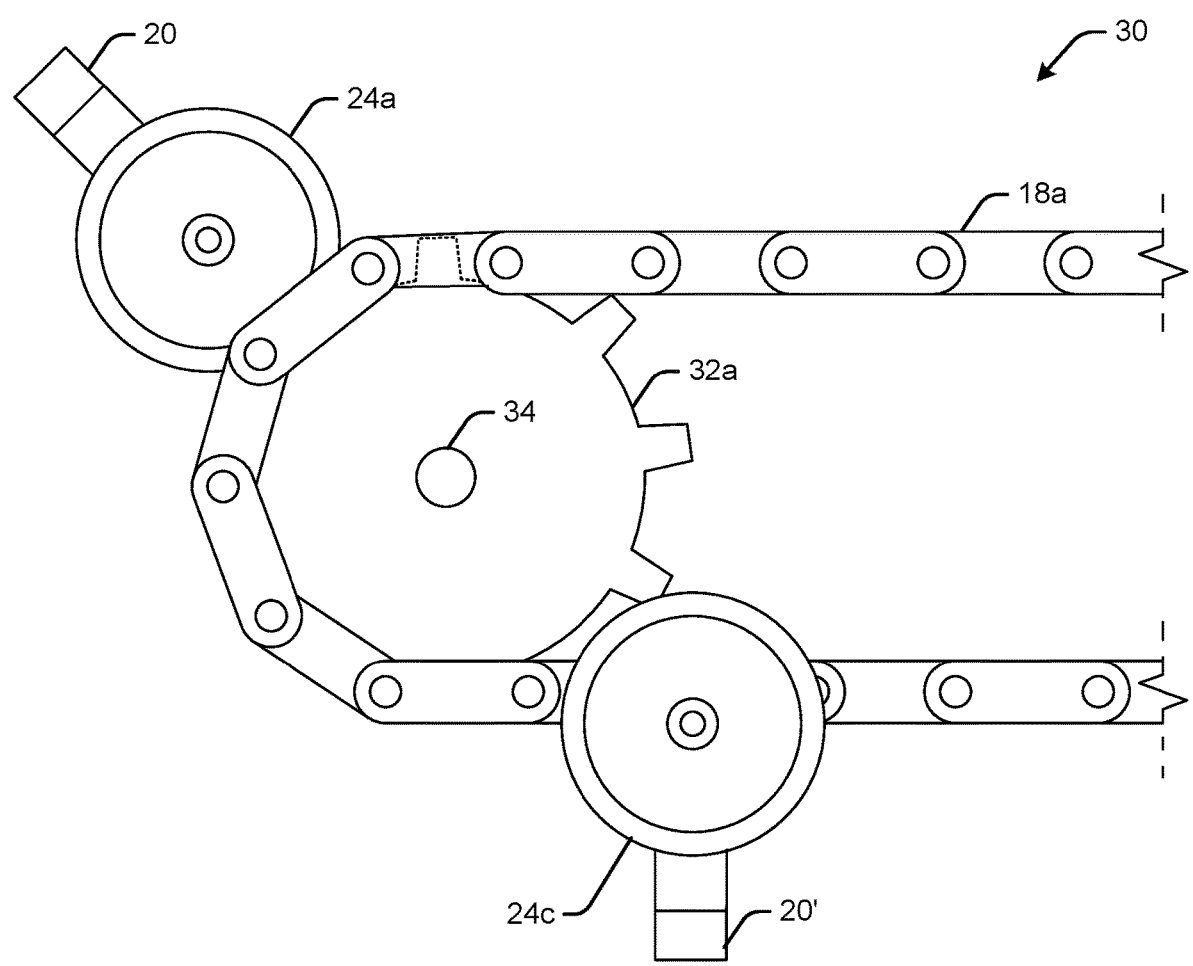
FIG. 5 is a side view of a primary drive system of the example rail wheel chain conveyor.

In an example, the rail wheel chain conveyor 10 includes at least one drive system. FIG. 5 is a side view of a primary drive system 30 of the example rail wheel chain conveyor 10. For illustration, one of the teeth of chainring 32a is shown in dashed lines, but it is noted that the teeth continue around the entire perimeter of the chainring 32a. In FIG. 5, the conveyor belt 16 has also been omitted for clarity. A primary drive system 30 may be provided at one end of the loop of the conveyor belt 16. In an example, two primary drive systems may be provided, one drive system 30 at each end (both ends) of the loop of the conveyor belt 16.

The primary drive system 30 may include one or more primary chainring(s) 32a-c (only 32a is visible in FIG. 5) mounted on a drive shaft 34 and engaging with the chain(s) 18a-c. Although a chainring is described herein, it is noted that gears and other components may also be implemented to transfer rotation of the driveshaft 34 to the chain(s) 18a-c to move the conveyor belt 16. In addition, the drive shaft 34 may include more than one chainring (e.g., corresponding to each of the chain(s) 18a-c).

The chainring(s) 32a-c are mounted to the drive shaft 34 to rotate with the drive shaft 34 and transfer rotational torque of the driveshaft 34 to the chainring(s) 32a-c. A primary drive motor (not shown), such as an electric motor, Diesel motor, etc. rotates the drive shaft 34, thereby rotating the chainring 32a-c, which in turn moves the conveyor belt 16 along its continuous path. A reducer and/or other gearing may be provided to convert rotational energy from the drive motor to the driveshaft 34.

In an example, the primary chainrings 32a-c engages the chain(s) 18a-c in both a first travel direction for transporting ore or other material (e.g., pulling the loaded, upright facing conveyor belt 16), and in a second travel direction for returning the conveyor belt 16 (e.g., pulling the empty, upside down facing conveyor belt).

Figure 6:
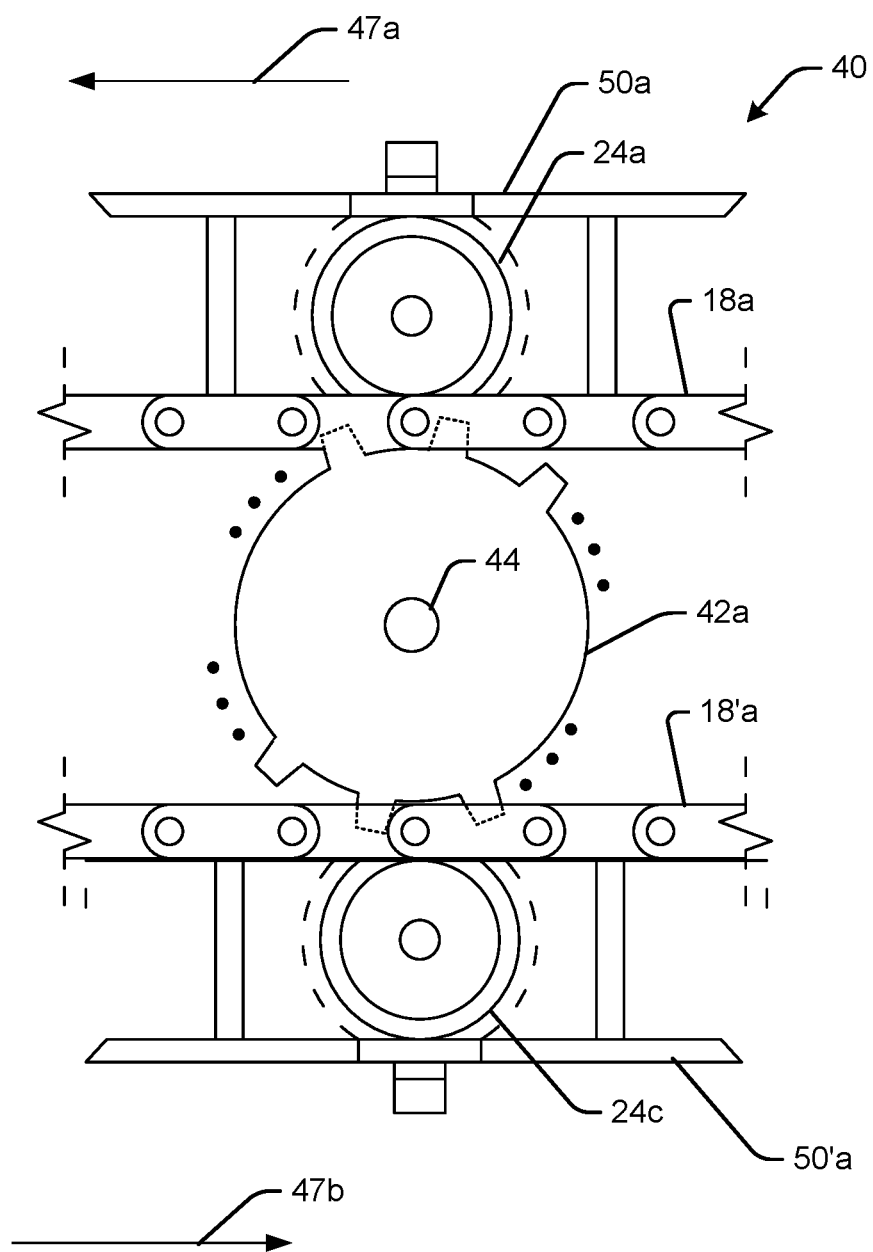
FIG. 6 is a side view of a secondary drive system of the example rail wheel chain conveyor.

In an example, one or more secondary drive system(s) may be provided, e.g., spaced between the ends of the loop of the conveyor belt. FIG. 6 is a side view of a secondary drive system 40 of the example rail wheel chain conveyor 10. It is noted that the dots indicate that the teeth continue around the entire perimeter of the chainring 42a. The secondary drive system(s) 40 may each have secondary chainring(s) 42a-c (only 42a is visible in FIG. 6) mounted on a secondary drive shaft 44 to engage with the chain(s) 18a-c. A secondary drive motor 46 (FIG. 2) rotates the secondary drive shaft 44, thereby rotating the chainring 42a-c and moving the conveyor belt 16 along the continuous path.

In an example, the secondary chainring 42a-c engages the corresponding chain(s) 18a-c in both a first travel direction (illustrated by arrow 47a in FIG. 6) for transporting ore or other material (e.g., pulling the loaded, upright facing conveyor belt 16), and in a second travel direction (illustrated by arrow 47b in FIG. 6) for returning the conveyor belt 16 (e.g., pulling the empty, upside down facing conveyor belt 16). In another example, the secondary chainring 42a-c only engages the chain(s) 18a-c in a first travel direction (e.g., pulling the loaded upward facing conveyor belt), while the chain(s) 18'a-c on the downward facing conveyor belt 16' are not engaged by the secondary chainring(s) 42a-c, and thus the downward facing conveyor belt 16' is not directly driven.

It is noted that the terms primary and secondary as these terms refer to the drive system(s) are only intended to distinguish between the drive system(s) 30 at the end(s) of the loop of the conveyor belt 16, and those drive system(s) 40 in between the ends of the loop of the conveyor belt 16. While these drive systems 30, 40 may include different size motors and/or other components, the drive systems 30, 40 may also be similarly configured to one another.

In an example, the rail wheel chain conveyor 10 includes one or more rail wheel guards 50a and 50b. The rail wheel guards 50a and 50b may be configured as stoppers that help prevent the rail wheels 24a, 24b (and additional rail wheel guards not shown for rail wheels 24c and 24d) from going off of the rails 12a and 12b. The rail wheel guards 50a and 50b may be installed anywhere along the length of the conveyor belt 16 path (including along the entire length of the path, if desired). In an example, the rail wheel guards 50a and 50b are installed at or near the drive systems 30 and/or 40 to help prevent the wheels 24a, 24b from going off the rails 12a and 12b. For example, the chainrings 32a-c and/or 42a-c may cause the chain 16 to raise vertically and cause the chains 18a-c to jump or become misaligned with the teeth of the chainrings 32a-c and/or 42a-c. The rail wheel guards 50a and 50b may also aid in keeping the chain 16 in closer contact with the chainrings 32a-c and/or 42a-c.

Figure 7:
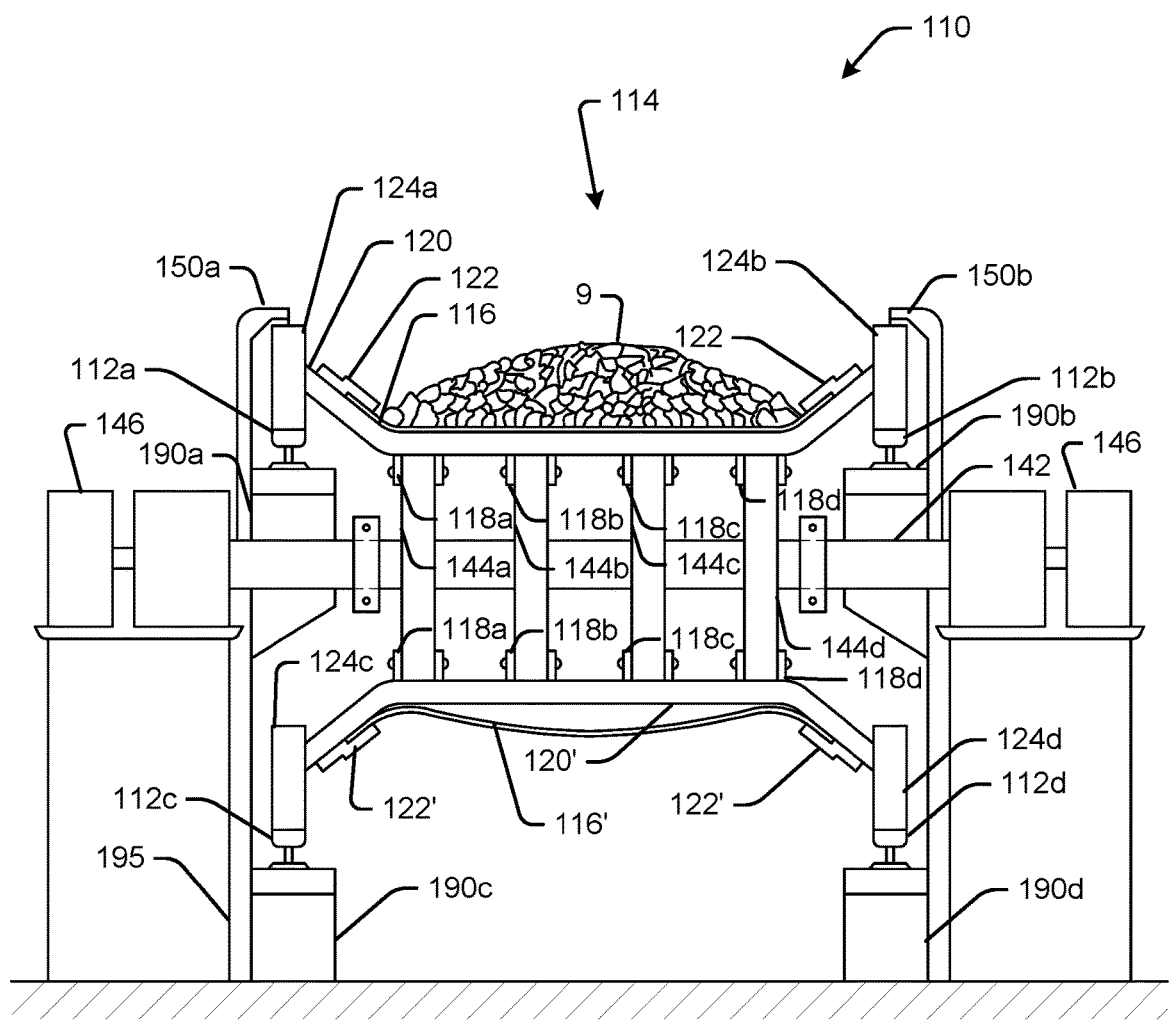
FIG. 7 is a front view of another example rail wheel chain conveyor.
Figure 8:
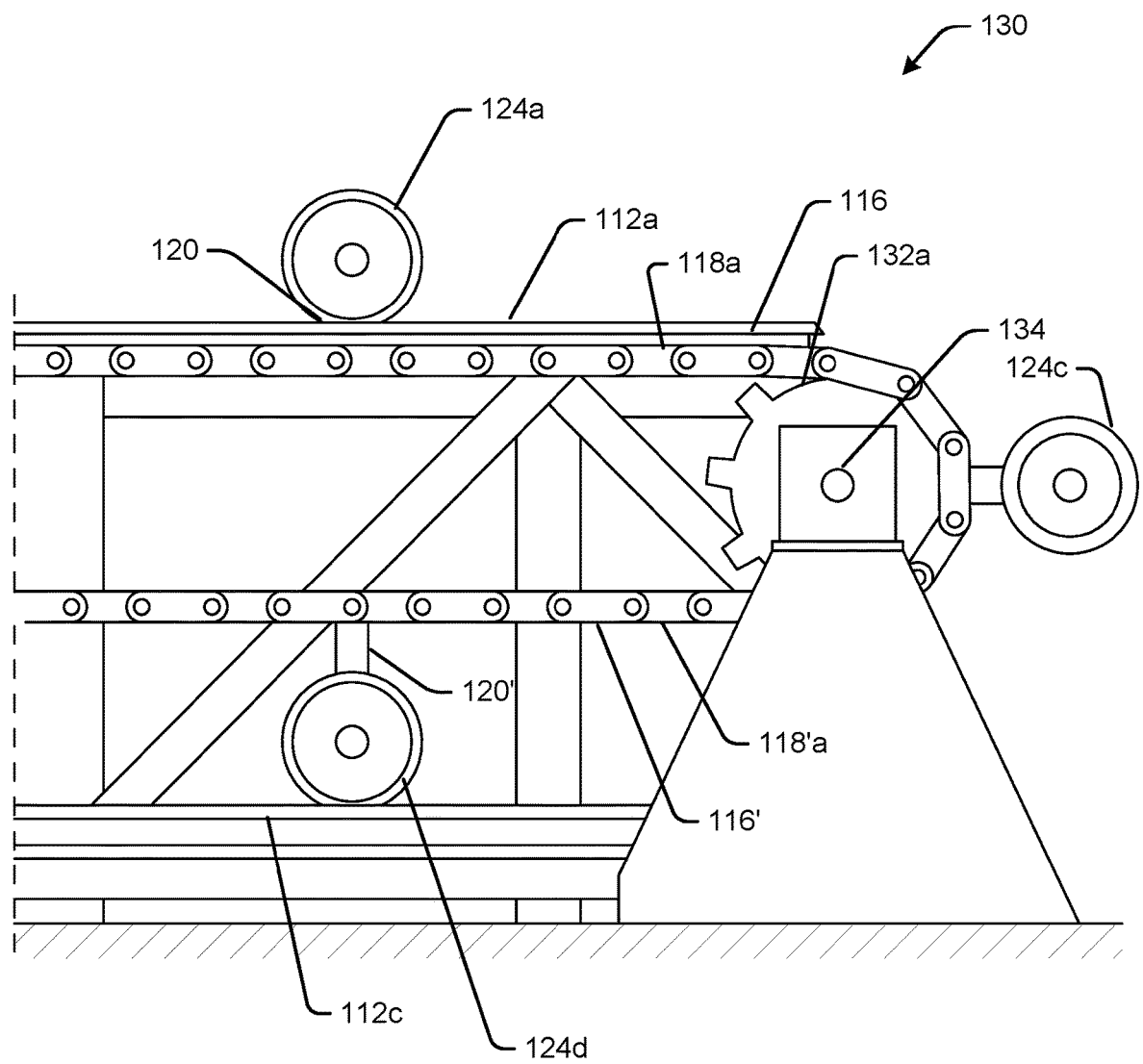
FIG. 8 is a side view of the primary drive system corresponding to the rail wheel chain conveyor shown in FIG. 7.
Figure 9:
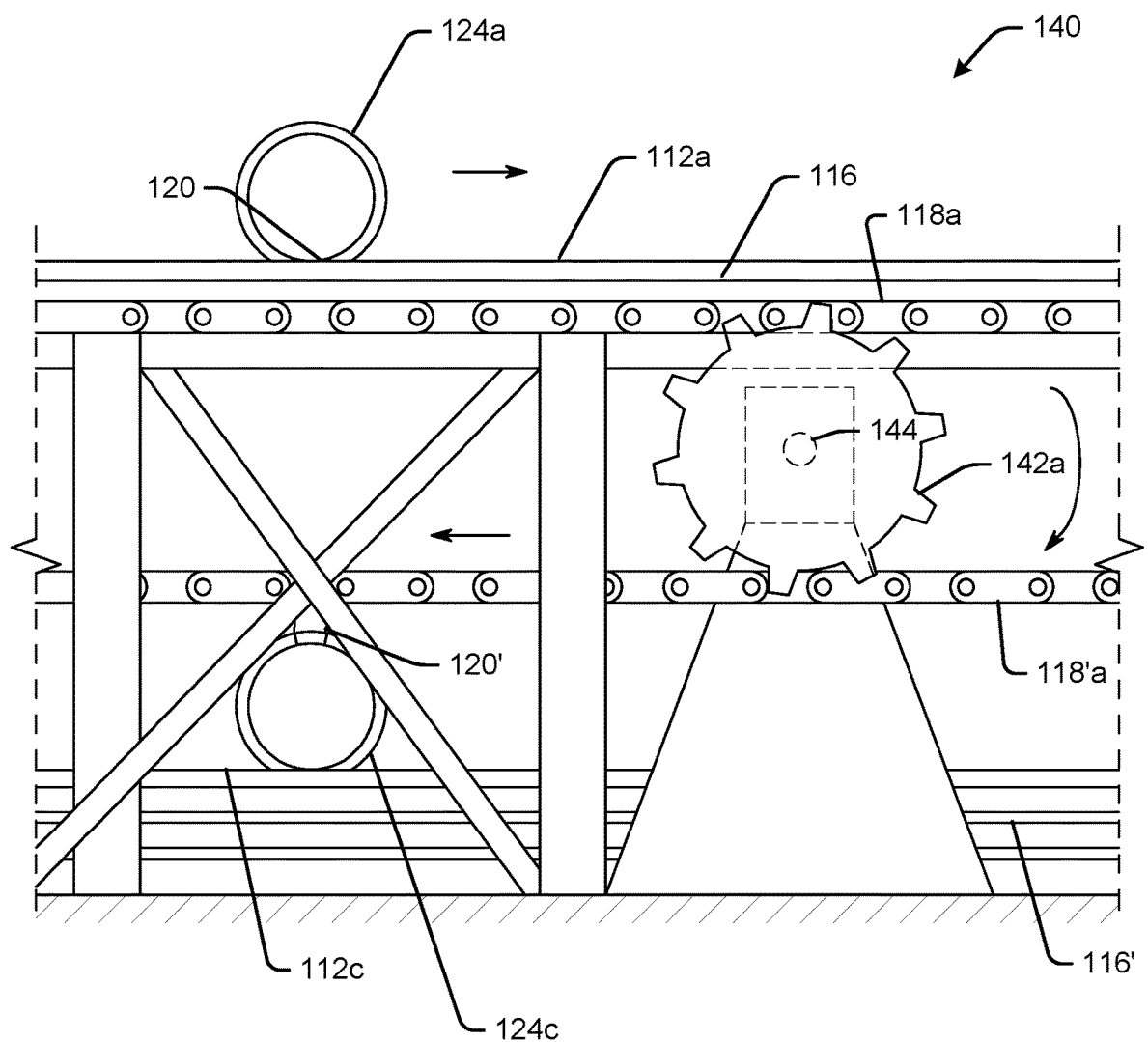
FIG. 9 is a side view of the secondary drive system corresponding to the rail wheel chain conveyor shown in FIG. 7.

FIG. 7 is another front view of another example rail wheel chain conveyor 110. FIG. 8 is a side view of the primary drive system 130 corresponding to the rail wheel chain conveyor 110 shown in FIG. 7. FIG. 9 is a side view of the secondary drive system 140 corresponding to the rail wheel chain conveyor 110 shown in FIG. 7. It is noted that 100-series reference numbers are shown corresponding to similar reference numbers already described above, and therefore may not be described again for these figures.

The example rail wheel chain conveyor 110 shown in FIGS. 7-9 includes a belt 116 sitting on top of the chains 118. The belt 116 is clamped to the rocker arms 120 or beams. Again, the belt 116 is not the pulling entity, but rather only a bearing entity. Movement is accomplished via the chain 118 and one or more chain drive system(s) 130, 140.

The example rail wheel chain conveyor 110 also includes small rail wheels 124a-d attached to the rocker arms/beams 120 to ride on the rails 112a-d and provide the belt 116 with the ability to move and carry the ore (or other loads).

The number of secondary drive systems 140 may be determined based on a specific project need and/or on the desired length of the conveyor system 110. The drives 130, 140 provide torque to both top (loaded) and bottom (returning/idle) chains 118 of the conveyor belt 116. The bottom portion of the conveyor belt 116' also moves using the rail wheels that move on the bottom rails. The drives 130, 140 may be installed on a concrete pad 190c-d or rigidly attached 190a-b to the frame 195 of the conveyor system 110. It is noted that installing a concrete pad may help to decrease the external stresses to the frame of the conveyor system 110. Depending on the need, one can also install more secondary drive systems 140, but with less power output to further reduce the stresses on the frame of the conveyor system 110, as well as increase redundancy in case one of the drive systems 130, 140 fails.

In an example, an automatic lubrication sprayer (not shown) may be provided at the desired location(s) along the path of the conveyor belt to provide lubrication to the chains.

In an example, a jack and/or jack platform (not shown) may be provided at the desired location(s) on both sides of the conveyor to enable wheel replacement when needed.

It is noted that the examples shown and described are provided for purposes of illustration and are not intended to be limiting. Still other examples are also contemplated.

The invention claimed is:

1. A rail wheel chain conveyor, comprising:
   a first rail spaced apart from a second rail to form a transport area therebetween;
   a third rail spaced apart from a fourth rail, wherein the first and second rails form an upper rail path and the third and fourth rails form a lower rail path;
   a conveyor belt configured in the transport area as a loop for moving the conveyor belt along a continuous path to transport material;
   a plurality of rocker arms spaced apart from one another along a length of the conveyor belt;
   a rail wheel on each side of each of the rocker arms riding on the first and second rails;
   a chain mounted to an underside of the conveyor belt by being rigidly attached to a corresponding one of the plurality of rocker arms;
   at least one primary drive system having:
      a primary driveshaft;
      a primary chainring mounted on the primary drive shaft and engaging with the chain; and
      a primary drive motor to rotate the primary drive shaft, thereby rotating the primary chainring and moving the conveyor belt along the continuous path.

2. The rail wheel chain conveyor of claim 1, wherein the first rail wheel and the second rail wheel ride on the upper rail path to move the conveyor belt in an upright configuration for transporting the material.

3. The rail wheel chain conveyor of claim 1, wherein the third rail wheel and the fourth rail wheel ride on the lower rail path to move the conveyor belt in an upside down configuration for returning the conveyor belt.

4. The rail wheel chain conveyor of claim 1, wherein the plurality of rocker arms form a generally U-shaped profile to provide sides to the conveyor belt.

5. The rail wheel chain conveyor of claim 1, wherein the conveyor belt is attached to the plurality of rocker arms.

6. The rail wheel chain conveyor of claim 1, wherein the primary chainring engages the chain in both a first travel direction for transporting material, and in a second travel direction for returning the conveyor belt.

7. The rail wheel chain conveyor of claim 1, wherein the at least one primary drive system is on at least one end of the loop formed by the conveyor belt.

8. The rail wheel chain conveyor of claim 1, further comprising at least one secondary drive system having a secondary chainring mounted on a secondary drive shaft and engaging with the chain.

9. The rail wheel chain conveyor of claim 8, further comprising a secondary drive motor to rotate the secondary drive shaft, thereby rotating the secondary chainring and moving the conveyor belt along the continuous path.

10. The rail wheel chain conveyor of claim 1, further comprising rail wheel guards configured as stoppers that help prevent the rail wheels from going off of the rails.

11. A rail wheel chain conveyor, comprising:
    a first rail forming a first side;
    a second rail forming a second side, the second rail spaced apart from the first rail to form a transport area therebetween;

a third rail on the first side and a fourth rail on the second side, wherein the first and second rails form an upper rail path and the third and fourth rails form a lower rail path;
a conveyor belt configured as a loop for moving along a continuous path;
a plurality of rocker arms spaced apart from one another and configured to support the conveyor belt;
a first rail wheel on a first side of each of the rocker arms, the first rail wheel riding on the first rail;
a second rail wheel on a second side of each of the rocker arms, the second rail wheel riding on the second rail;
a chain mounted to an underside of the conveyor belt by being rigidly attached to the rocker arm;
a primary drive system having:
 a primary chainring mounted on a drive shaft and engaging with the chain; and
 a primary drive motor to rotate the drive shaft, thereby rotating the primary chainring and moving the conveyor belt along the continuous path.

12. The rail wheel chain conveyor of claim 11, wherein the first rail wheel and the second rail wheel ride on the upper rail path to move the conveyor belt in an upright configuration for transporting ore or other material, and wherein the third rail wheel and the fourth rail wheel ride on the lower rail path to move the conveyor belt in an upside down configuration for returning the conveyor belt.

13. The rail wheel chain conveyor of claim 11, wherein the plurality of rocker arms have a generally U-shaped profile to provide sides to the conveyor belt.

14. The rail wheel chain conveyor of claim 11, wherein the conveyor belt is attached to the plurality of rocker arms.

15. The rail wheel chain conveyor of claim 11, wherein the primary chainring engages the chain in both a first travel direction for transporting material, and in a second travel direction for returning the conveyor belt.

16. The rail wheel chain conveyor of claim 11, wherein the primary drive system is on at least one end of the loop formed by the conveyor belt.

17. The rail wheel chain conveyor of claim 11, further comprising a secondary drive system having:
 a secondary chainring mounted on a drive shaft and engaging with the chain; and
 a secondary drive motor to rotate the drive shaft, thereby rotating the secondary chainring and moving the conveyor belt along the continuous path.

18. The rail wheel chain conveyor of claim 11, further comprising rail wheel guards configured as stoppers that help prevent the rail wheels from going off of the rails.

19. A rail wheel chain conveyor, comprising:
a first rail spaced apart from a second rail to form a transport area therebetween;
a conveyor belt configured in the transport area as a loop for moving the conveyor belt along a continuous path to transport material;
a plurality of rocker arms spaced apart from one another along a length of the conveyor belt, wherein the plurality of rocker arms form a generally U-shaped profile to provide sides to the conveyor belt;
a rail wheel on each side of each of the rocker arms riding on the first and second rails;
a chain mounted to an underside of the conveyor belt by being rigidly attached to a corresponding one of the plurality of rocker arms;
at least one primary drive system having:
 a primary driveshaft;
 a primary chainring mounted on the primary drive shaft and engaging with the chain; and
 a primary drive motor to rotate the primary drive shaft, thereby rotating the primary chainring and moving the conveyor belt along the continuous path.

20. A rail wheel chain conveyor, comprising:
a first rail spaced apart from a second rail to form a transport area therebetween;
a conveyor belt configured in the transport area as a loop for moving the conveyor belt along a continuous path to transport material;
a plurality of rocker arms spaced apart from one another along a length of the conveyor belt, wherein the conveyor belt is attached to the plurality of rocker arms;
a rail wheel on each side of each of the rocker arms riding on the first and second rails;
a chain mounted to an underside of the conveyor belt by being rigidly attached to a corresponding one of the plurality of rocker arms;
at least one primary drive system having:
 a primary driveshaft;
 a primary chainring mounted on the primary drive shaft and engaging with the chain; and
 a primary drive motor to rotate the primary drive shaft, thereby rotating the primary chainring and moving the conveyor belt along the continuous path.

21. A rail wheel chain conveyor, comprising:
a first rail spaced apart from a second rail to form a transport area therebetween;
a conveyor belt configured in the transport area as a loop for moving the conveyor belt along a continuous path to transport material;
a plurality of rocker arms spaced apart from one another along a length of the conveyor belt;
a rail wheel on each side of each of the rocker arms riding on the first and second rails;
a chain mounted to an underside of the conveyor belt by being rigidly attached to a corresponding one of the plurality of rocker arms;
at least one primary drive system having:
 a primary driveshaft;
 a primary chainring mounted on the primary drive shaft and engaging with the chain, wherein the primary chainring engages the chain in both a first travel direction for transporting material, and in a second travel direction for returning the conveyor belt; and
 a primary drive motor to rotate the primary drive shaft, thereby rotating the primary chainring and moving the conveyor belt along the continuous path.

22. A rail wheel chain conveyor, comprising:
a first rail spaced apart from a second rail to form a transport area therebetween;
a conveyor belt configured in the transport area as a loop for moving the conveyor belt along a continuous path to transport material;
a plurality of rocker arms spaced apart from one another along a length of the conveyor belt;
a rail wheel on each side of each of the rocker arms riding on the first and second rails;
a chain mounted to an underside of the conveyor belt by being rigidly attached to a corresponding one of the plurality of rocker arms;
at least one primary drive system on at least one end of the loop formed by the conveyor belt, the at least one primary drive system having:
 a primary driveshaft;

a primary chainring mounted on the primary drive shaft and engaging with the chain; and
a primary drive motor to rotate the primary drive shaft, thereby rotating the primary chainring and moving the conveyor belt along the continuous path.

23. A rail wheel chain conveyor, comprising:
a first rail spaced apart from a second rail to form a transport area therebetween;
a conveyor belt configured in the transport area as a loop for moving the conveyor belt along a continuous path to transport material;
a plurality of rocker arms spaced apart from one another along a length of the conveyor belt;
a rail wheel on each side of each of the rocker arms riding on the first and second rails;
a chain mounted to an underside of the conveyor belt by being rigidly attached to a corresponding one of the plurality of rocker arms;
at least one primary drive system having:
a primary driveshaft;
a primary chainring mounted on the primary drive shaft and engaging with the chain;
a primary drive motor to rotate the primary drive shaft, thereby rotating the primary chainring and moving the conveyor belt along the continuous path;
at least one secondary drive system having a secondary chainring mounted on a secondary drive shaft and engaging with the chain; and
a secondary drive motor to rotate the secondary drive shaft, thereby rotating the chainring and moving the conveyor belt along the continuous path.

24. The rail wheel chain conveyor of claim 23, further comprising a secondary drive motor to rotate the secondary drive shaft, thereby rotating the secondary chainring and moving the conveyor belt along the continuous path.

25. A rail wheel chain conveyor, comprising:
a first rail forming a first side;
a second rail forming a second side, the second rail spaced apart from the first rail to form a transport area therebetween;
a conveyor belt configured as a loop for moving along a continuous path;
a plurality of rocker arms spaced apart from one another and configured to support the conveyor belt, the plurality of rocker arms have a generally U-shaped profile to provide sides to the conveyor belt;
a first rail wheel on a first side of each of the rocker arms, the first rail wheel riding on the first rail;
a second rail wheel on a second side of each of the rocker arms, the second rail wheel riding on the second rail;
a chain mounted to an underside of the conveyor belt by being rigidly attached to the rocker arm;
a primary drive system having:
a primary chainring mounted on a drive shaft and engaging with the chain; and
a primary drive motor to rotate the drive shaft, thereby rotating the primary chainring and moving the conveyor belt along the continuous path.

26. A rail wheel chain conveyor, comprising:
a first rail forming a first side;
a second rail forming a second side, the second rail spaced apart from the first rail to form a transport area therebetween;
a conveyor belt configured as a loop for moving along a continuous path;
a plurality of rocker arms spaced apart from one another and configured to support the conveyor belt;

a first rail wheel on a first side of each of the rocker arms, the first rail wheel riding on the first rail;
a second rail wheel on a second side of each of the rocker arms, the second rail wheel riding on the second rail;
a chain mounted to an underside of the conveyor belt by being rigidly attached to the rocker arm;
a primary drive system having:
a primary chainring mounted on a drive shaft and engaging with the chain, the primary chainring engages the chain in both a first travel direction for transporting material, and in a second travel direction for returning the conveyor belt; and
a primary drive motor to rotate the drive shaft, thereby rotating the primary chainring and moving the conveyor belt along the continuous path.

27. A rail wheel chain conveyor, comprising:
a first rail forming a first side;
a second rail forming a second side, the second rail spaced apart from the first rail to form a transport area therebetween;
a conveyor belt configured as a loop for moving along a continuous path;
a plurality of rocker arms spaced apart from one another and configured to support the conveyor belt;
a first rail wheel on a first side of each of the rocker arms, the first rail wheel riding on the first rail;
a second rail wheel on a second side of each of the rocker arms, the second rail wheel riding on the second rail;
a chain mounted to an underside of the conveyor belt by being rigidly attached to the rocker arm;
a primary drive system on at least one end of the loop formed by the conveyor belt, the primary drive system having:
a primary chainring mounted on a drive shaft and engaging with the chain; and
a primary drive motor to rotate the drive shaft, thereby rotating the primary chainring and moving the conveyor belt along the continuous path.

28. A rail wheel chain conveyor, comprising:
a first rail forming a first side;
a second rail forming a second side, the second rail spaced apart from the first rail to form a transport area therebetween;
a conveyor belt configured as a loop for moving along a continuous path;
a plurality of rocker arms spaced apart from one another and configured to support the conveyor belt;
a first rail wheel on a first side of each of the rocker arms, the first rail wheel riding on the first rail;
a second rail wheel on a second side of each of the rocker arms, the second rail wheel riding on the second rail;
a chain mounted to an underside of the conveyor belt by being rigidly attached to the rocker arm;
a primary drive system having:
a primary chainring mounted on a drive shaft and engaging with the chain;
a primary drive motor to rotate the drive shaft, thereby rotating the primary chainring and moving the conveyor belt along the continuous path;
a secondary drive system having:
a secondary chainring mounted on a drive shaft and engaging with the chain; and
a secondary drive motor to rotate the drive shaft, thereby rotating the secondary chainring and moving the conveyor belt along the continuous path.

* * * * *